United States Patent
Kim et al.

(10) Patent No.: US 11,514,825 B2
(45) Date of Patent: Nov. 29, 2022

(54) WINDOW AND DISPLAY DEVICE INCLUDING THE SAME

(71) Applicant: Samsung Display Co., Ltd., Yongin-si (KR)

(72) Inventors: Kyung-Man Kim, Anyang-si (KR); Minsang Koo, Seongnam-si (KR); Sanghoon Kim, Hwaseong-si (KR); Yuri Kim, Guri-si (KR); Min-Hoon Choi, Seoul (KR); Seongjin Hwang, Suwon-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/529,987

(22) Filed: Nov. 18, 2021

(65) Prior Publication Data
US 2022/0301463 A1 Sep. 22, 2022

(30) Foreign Application Priority Data
Mar. 16, 2021 (KR) .......................... 10-2021-0034283

(51) Int. Cl.
| G06F 3/041 | (2006.01) |
| G09F 9/30 | (2006.01) |
| G02B 1/14 | (2015.01) |
| G02B 1/118 | (2015.01) |
| G06F 1/16 | (2006.01) |

(52) U.S. Cl.
CPC .............. *G09F 9/301* (2013.01); *G02B 1/118* (2013.01); *G02B 1/14* (2015.01); *G06F 1/1652* (2013.01)

(58) Field of Classification Search
CPC .................. G09F 9/301; G06F 1/1652; G06F 2203/04102; G02B 1/14; G02B 1/118
See application file for complete search history.

(56) References Cited

U.S. PATENT DOCUMENTS

| 9,354,476 | B2 | 5/2016 | Han et al. |
| 9,729,688 | B2* | 8/2017 | Lee ..................... H04M 1/0279 |
| 10,013,028 | B2* | 7/2018 | Ahn ....................... G06F 1/1652 |
| 10,020,462 | B1 | 7/2018 | Ai et al. |
| 10,838,458 | B1* | 11/2020 | Park ....................... G06F 1/1681 |
| 11,175,693 | B2* | 11/2021 | Song ..................... G09G 3/3208 |
| 11,343,927 | B2* | 5/2022 | Choi ..................... H05K 5/0086 |
| 2014/0226275 | A1* | 8/2014 | Ko ........................ G06F 1/1681 |
| | | | 361/679.27 |

(Continued)

FOREIGN PATENT DOCUMENTS

| JP | 2019-219545 | 12/2019 |
| KR | 10-2013-0068549 | 6/2013 |

(Continued)

*Primary Examiner* — Joe H Cheng
(74) *Attorney, Agent, or Firm* — Kile Park Reed & Houtteman PLLC (57) ABSTRACT

A window includes a base layer including a first non-folding region; a second non-folding region; a folding region disposed between the first non-folding region and the second non-folding region in a first direction; and at least one first recessed portion overlapping the folding region and extending in a second direction intersecting the first direction, a first nano pattern layer disposed in the at least one first recessed portion, and including first protrusion patterns; and a first soft portion disposed on the first nano pattern layer.

20 Claims, 7 Drawing Sheets (56) References Cited

U.S. PATENT DOCUMENTS

| | | | | |
|---|---|---|---|---|
| 2018/0077810 A1* | 3/2018 | Moon | .................... | G06F 1/1618 |
| 2018/0192527 A1* | 7/2018 | Yun | ........................ | G06F 1/1681 |
| 2020/0319672 A1* | 10/2020 | Kim | ...................... | G06F 1/1616 |
| 2021/0104694 A1* | 4/2021 | Yee | ......................... | H01L 51/56 |
| 2021/0192984 A1* | 6/2021 | Yoo | ...................... | H04M 1/0268 |
| 2021/0337686 A1* | 10/2021 | Sim | ........................ | G06F 1/1637 |
| 2022/0011813 A1* | 1/2022 | Kim | ...................... | G06F 1/1641 |
| 2022/0043187 A1* | 2/2022 | Choi | .................... | H04M 1/0268 |

FOREIGN PATENT DOCUMENTS

| | | |
|---|---|---|
| KR | 10-2015-0145002 | 12/2015 |
| KR | 10-2019-0075715 | 7/2019 |

\* cited by examiner

WINDOW AND DISPLAY DEVICE INCLUDING THE SAME

CROSS-REFERENCE TO RELATED APPLICATION(S)

This application claims priority to and benefits of Korean Patent Application No. 10-2021-0034283 under 35 U.S.C. § 119, filed on Mar. 16, 2021 in the Korean Intellectual Property Office, the entire contents of which are incorporated herein by reference.

BACKGROUND

1. Technical Field

The disclosure herein relates to a window, and a display device including the same, and, to a window having improved optical characteristics while ensuring folding characteristics and impact resistance characteristics, and a display device including the same.

2. Description of the Related Art

Electronic devices such as smart phones, digital cameras, notebook computers, navigation systems, and smart televisions which provide a user with images include a display device for displaying images. A display device generates images, and provides a user with images through a display screen.

Recently, with the development of display device technologies, various types of display devices are being developed. For example, various flexible display devices which can be deformed, folded, or rolled into a curved shape are being developed. Flexible display devices of which the shapes are variously changeable are easy to carry, and improve user convenience.

A foldable display device among flexible display devices may be folded with respect to a folding axis extending in one direction. The foldable display device may include a flexible display panel, and a flexible window disposed on the display panel.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

The disclosure provides a window and a display device which have improved optical characteristics while ensuring folding characteristics and impact resistance characteristics.

An embodiment provides a window that may include a base layer including a first non-folding region; a second non-folding region; a folding region disposed between the first non-folding region and the second non-folding region in a first direction; and at least one first recessed portion overlapping the folding region and extending in a second direction intersecting the first direction; a first nano pattern layer disposed in the at least one first recessed portion, and including first protrusion patterns; and a first soft portion disposed on the first nano pattern layer.

In an embodiment, the window may further include a second soft portion disposed on an upper surface of the base layer, wherein the first soft portion and the second soft portion include a same material.

In an embodiment, the window may further include a second nano pattern layer disposed on a portion overlapping the first non-folding region and the second non-folding region of an upper surface of the base layer, and including second protrusion patterns.

In an embodiment, the first protrusion patterns may include at least one of a substantially conical shape, a substantially rotating parabolic shape, and a substantially hemispherical shape.

In an embodiment, a line width of each of the first protrusion patterns may be in a range of about 100 nm to about 350 nm, and a height of each of the first protrusion patterns may be in a range of about 200 nm to about 3000 nm.

In an embodiment, the at least one first recessed portion may comprise first recessed portions, and the first recessed portions may be each spaced apart in the first direction.

In an embodiment, the at least one first recessed portion may be recessed from an upper surface of the base layer, and a depth of the at least one first recessed portion recessed from the upper surface may be less than a thickness of the base layer.

In an embodiment, the at least one first recess portion may include a first inner surface on the base layer, and extending in a third direction intersecting the first direction and the second direction; a second inner surface extending in the third direction, and facing the first inner surface; and a first bottom surface perpendicular to the first inner surface and the second inner surface.

In an embodiment, the first nano pattern layer may be disposed on the first bottom surface.

In an embodiment, the first nano pattern layer may be disposed on the first inner surface and the second inner surface.

In an embodiment, at least one second recessed portion recessed from a lower surface of the base layer and extending in the second direction may be formed in the base layer, and the window may include a third nano pattern layer disposed on the at least one second recessed portion, and including third protrusion patterns.

In an embodiment, the at least one first recessed portion may include first recessed portions and the at least one second recessed portion may include second recessed portions, and the first recessed portions and second recessed portions may be alternately disposed in the first direction.

In an embodiment, the window may further include a third soft portion disposed in the at least one second recessed portion.

In an embodiment, the at least one first recessed portion may pass through the base layer, and the at least one first recessed portion may be formed by a third inner surface on the base layer and extending in a third direction intersecting the first direction and the second direction; and a fourth inner surface extending in the third direction and facing the third inner surface.

In an embodiment, the first nano pattern layer may contact at least a portion of the third inner surface or the fourth inner surface.

In an embodiment, the at least one first recessed portion may have a substantially curved surface shape extending in the first direction.

In an embodiment, a display device may include a display module including a folding region folded around a folding axis extending in a direction; and a window disposed on the display module, and folded with the display module, wherein the window may include a base layer including a first recessed portion overlapping the folding region and extending in the direction; a first nano pattern layer disposed on the first recessed portion, and including first protrusion patterns; and a first soft portion disposed on the first nano pattern layer, the first recessed portion may be recessed from an upper surface of the base layer.

In an embodiment, the display device may further include a second soft portion disposed on the upper surface of the base layer, wherein the first soft portion and the second soft portion may include a same material.

In an embodiment, the first protrusion patterns may each include at least one of a substantially conical shape, a substantially rotating parabolic shape, and a substantially hemispherical shape.

In an embodiment, a line width of each of the first protrusion patterns may be in a range of about 100 nm to about 350 nm, and a height of each of the first protrusion patterns may be in a range of about 200 nm to about 3000 nm.

BRIEF DESCRIPTION OF THE DRAWINGS

The accompanying drawings are included to provide a further understanding of the disclosure, and are incorporated in and constitute a part of this specification. The drawings illustrate embodiments and, together with the description, serve to explain principles of the disclosure. In the drawings.

DETAILED DESCRIPTION OF THE EMBODIMENTS

Hereinafter, embodiments will be described with reference to the accompanying drawings.

In this specification, when a component (or region, layer, portion, etc.) is referred to as "on", "connected", or "coupled" to another component, it means that it is connected or coupled directly on the other component or a third component or other component or components can be arranged or disposed between them.

It will be understood that the terms "connected to" or "coupled to" may include a physical or electrical connection or coupling.

The same reference numerals refer to the same elements. In the drawings, thicknesses, ratios, and dimensions of components may be exaggerated for effective description of technical content.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

In the specification and the claims, the phrase "at least one of" is intended to include the meaning of "at least one selected from the group of" for the purpose of its meaning and interpretation. For example, "at least one of A and B" may be understood to mean "A, B, or A and B."

Terms such as first and second may be used to describe various components, but the components should not be limited by such terms. These terms are only used for the purpose of distinguishing one component from other components. For example, without departing from the scope of the disclosure, a first component may be referred to as a second component, and similarly, a second component may be referred to as a first component. Singular expressions include plural expressions unless the context clearly indicates otherwise. For example, as used herein, the singular forms, "a," "an," and "the" are intended to include the plural forms as well, unless the context clearly indicates otherwise.

Terms such as "below", "lower", "above", and "upper" are used to describe the relationship between components shown in the drawings. The terms are relative concepts and are described based on the directions indicated in the drawings but are not limited thereto.

For example, the spatially relative terms "below", "beneath", "lower", "above", "upper", or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations.

The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art.

When an element is described as 'not overlapping' or 'to not overlap' another element, this may include that the elements are spaced apart from each other, offset from each other, or set aside from each other or any other suitable term as would be appreciated and understood by those of ordinary skill in the art.

The terms "face" and "facing" mean that a first element may directly or indirectly oppose a second element. In a case in which a third element intervenes between the first and second element, the first and second element may be understood as being indirectly opposed to one another, although still facing each other.

The terms "comprises," "comprising," "includes," and/or "including,", "has," "have," and/or "having," and variations thereof when used in this specification, specify the presence of stated features, integers, steps, operations, elements, components, and/or groups thereof, but do not preclude the presence or addition of one or more other features, integers, steps, operations, elements, components, and/or groups thereof.

In the specification, "directly in contact" may mean that there is no layer, film, region, plate, etc. added between a portion such as a layer, film, region, or plate and another portion. For example, "direct contact" may mean placing two layers or two members without using an additional member such as an adhesive member therebetween.

The phrase "in a plan view" means viewing the object from the top, and the phrase "in a schematic cross-sectional view" means viewing a cross-section of which the object is vertically cut from the side.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. Terms such those defined in commonly used dictionaries should be interpreted as having a meaning consistent with the meaning in the context of the related technology, and should not be interpreted in an ideal or excessively formal meaning, unless so defined herein.

Hereinafter, embodiments will be described with reference to the accompanying drawings.

Figure 1:
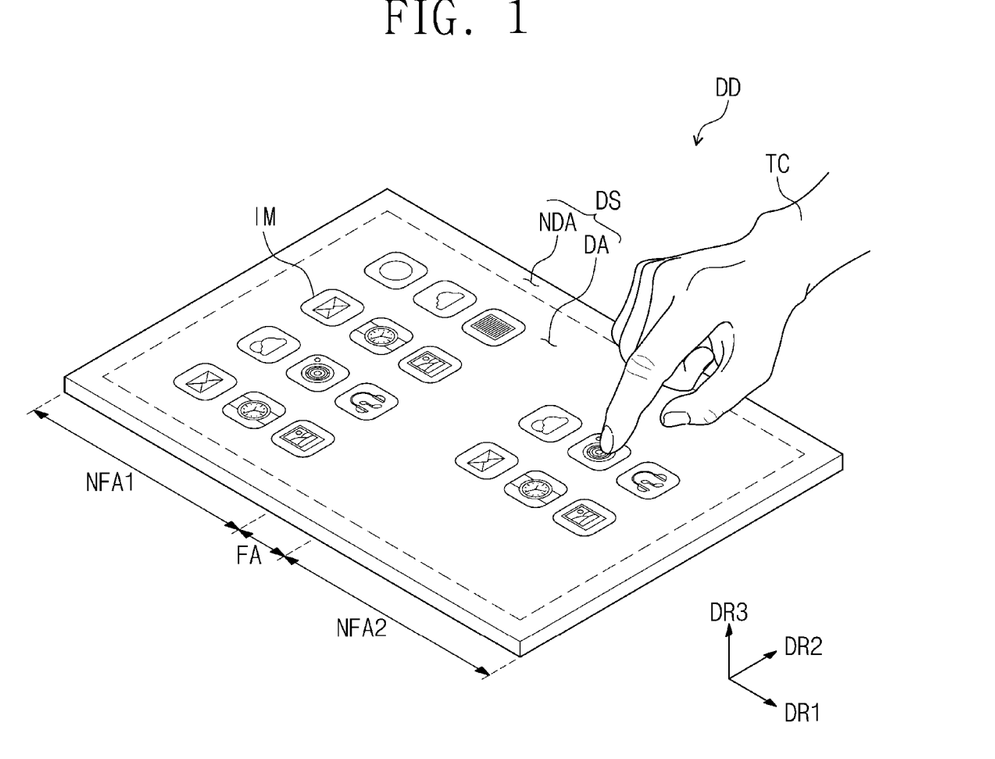
FIG. 1 is a schematic perspective view of a display device according to an embodiment.
Figure 2:
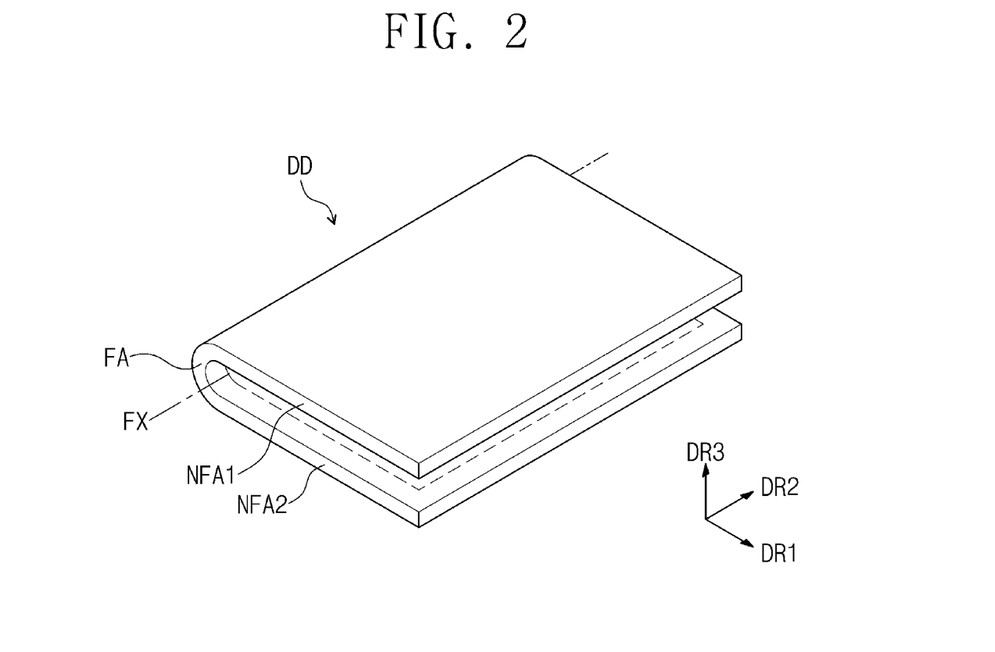
FIG. 2 is a diagram illustrating a folded state of a display device illustrated in FIG. 1.

FIG. 1 is a schematic perspective view of a display device according to an embodiment. FIG. 2 is a diagram illustrating a folded state of a display device illustrated in FIG. 1.

Referring to FIGS. 1 and 2, a display device DD may be a foldable display device. The display device DD according to the disclosure may be used in not only large electronic devices such as televisions and monitors, but also small- and medium-sized electronic devices such as mobile phones, tablets, car navigation systems, game consoles, and smart watches.

The upper surface of the display device DD may be defined as a display surface DS, and in case that the display device DD is unfolded, the display surface DS may have a plane defined by a first direction DR1 and a second direction DR2. A third direction DR3 which crosses or intersects the first direction DR1 and the second direction DR2 may be defined as the thickness direction of the display device DD. The front surface (or upper surface) and the rear surface (or lower surface) of members constituting the display device DD may be defined with respect to the third direction DR3.

The display surface DS may include a display region DA, and a non-display region NDA around or adjacent to the display region DA. The display region DA is a region on which images IM are displayed, and the non-display region NDA is a region on which images IM are not displayed. FIG. 1 illustrates application icons as an example of images IM and a user TC touching at least an icon.

The display region DA may be a substantially rectangular shape. The non-display region NDA may surround or may be adjacent to the display region DA. However, an embodiment is not limited thereto, and the shape of the display region DA and the shape of the non-display region NDA may be relatively designed. It is to be understood that shapes described herein may not necessarily be exact shapes and may include shapes substantially corresponding to or within a given shape or shapes herein.

A first non-folding region NFA1, a folding region FA, and a second non-folding region NFA2 may be sequentially defined on the display device DD along the first direction DR1. For example, the folding region FA may be defined between the first non-folding region NFA1 and the second non-folding region NFA2. FIGS. 1 and 2 illustrates one folding region FA, and first and second non-folding regions NFA1 and NFA2, but the numbers of the folding region FA, and first and second non-folding regions NFA1 and NFA2 are not limited thereto. For example, the display device DD may include non-folding regions of three or more, and folding regions disposed between the non-folding regions.

The display device DD may be folded with respect to a folding axis FX. For example, the folding region FA may be bent with respect to the folding axis FX. The folding axis FX may extend along the second direction DR2. The folding axis FX may be defined as an axis parallel to the short side of the display device DD.

In case that the display device DD is folded, the display surface of the first non-folding region NFA1 and the display surface of the non-folding region NFA2 may face each other. Accordingly, the display surface DS may not be exposed to the outside in a folded state. In an embodiment, a rear surface display region (not shown) may be provided on the rear surface of the display device DD. In case that the display device DD is folded, the rear surface display region may be exposed to the outside, and it may be referred to as "in-folding". However, this is an example, and the operation of the display device DD is not limited thereto.

For example, in an embodiment, in case that the display device DD is folded, the first non-folding region NFA1 and the second non-folding region NFA2 may be opposed to each other. Accordingly, the display region DA may be exposed to the outside in a folded state, and it may be referred to as "out-folding".

The display device DD may be capable of performing only one operation of in-folding or out-folding. By way of example, the display device DD may be capable of performing both an in-folding operation and an out-folding operation. The same region of the display device DD, for example, the folding region FA, may be in-folded and out-folded. By way of example, a partial region of the display device DD may be in-folded, and the other region of the display device DD may be out-folded.

Figure 3:
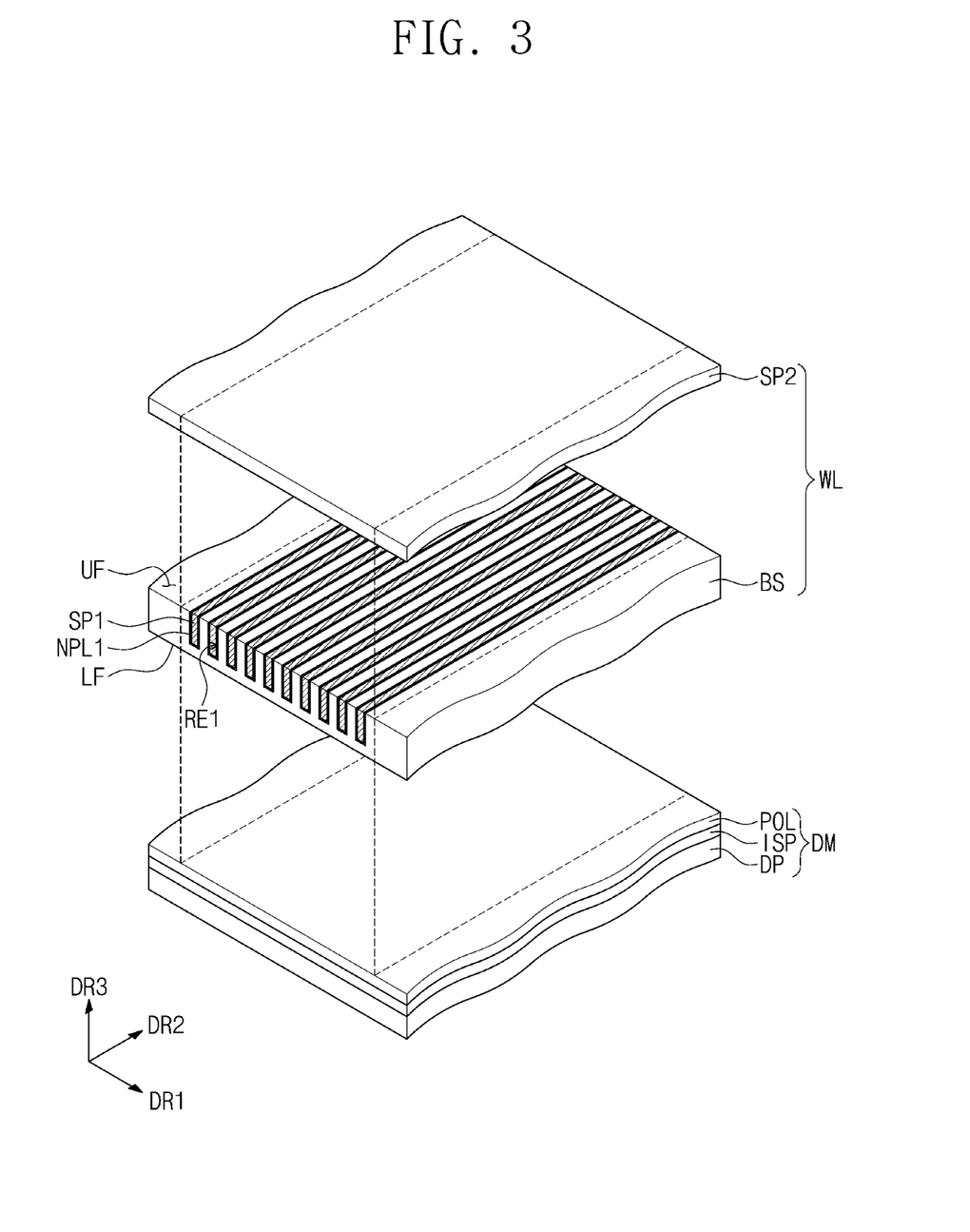
FIG. 3 is an exploded perspective view illustrating a display device according to an embodiment.

FIG. 3 is an exploded perspective view illustrating a display device according to an embodiment.

Referring to FIG. 3, the display device DD may include a display module DM and a window WL which may be sequentially stacked each other along the third direction DR3. Each of the display module DM and the window WL may be folded with respect to the folding axis FX (see FIGS. 1 and 2).

The display module DM may generate images in response to an electrical signal. The display module DM may include the display panel DP. The display panel DP may generate images. The display panel DP may be a liquid crystal display panel, or a light-emitting display panel, and is not specially limited thereto. For example, the light-emitting display panel may be an organic light-emitting display panel, or a quantum dot light-emitting display panel. A light-emitting layer of the organic light-emitting display panel may include an organic light-emitting material. A light-emitting layer of the quantum dot light-emitting display panel may include a quantum dot, a quantum rod, etc., within the spirit and the scope of the disclosure.

Although not shown separately, the display device DD may further include a supporting member which supports the display module DM. The supporting member may be disposed under or below the display module DM, thereby supporting the display module DM and preventing the display module DM from deforming. The supporting member may have an integrated plate shape corresponding to the shape of the display module DM. The supporting member having an integrated plate shape may include a structure that overlaps the folding region FA and increases the flexibility thereof. However, the shape of the supporting member is not limited thereto, and the supporting member may have a shape of at least two plates having the folding region FA therebetween, and spaced apart from each other.

The window WL may be disposed on the display module DM, and may protect the display module DM. The window WL may prevent the display module DM from being damaged or malfunctioning due to an external impact. The window WL may include an optically transparent insulating material. Accordingly, images generated in the display module DM may be recognized through the window WL by a user. For example, the display surface of the display device DD may be defined by the window WL.

The window WL may include a base layer BS, a first soft portion SP1, and a second soft portion SP2. A first recessed portion RE1 may be defined in the base layer BS. The first recessed portion RE1 may overlap the folding region FA, and may be recessed from the upper surface of the base layer BS. A first nano pattern layer NPL1 may be disposed on the first recessed portion RE1.

The first soft portion SP1 may be disposed on the first recessed portion RE1. For example, the first soft portion SP1 may be disposed on the first nano pattern layer NPL1 disposed on the first recessed portion RE1, and may entirely fill the first recessed portion RE1. Accordingly, the first soft portion SP1 may be parallel to the upper surface UF of the base layer BS.

The second soft portion SP2 may be disposed on the upper surface UF of the base layer BS. The second soft portion SP2 may be disposed entirely covering or overlapping the upper surface UF of the base layer BS. Accordingly, at least a portion of the second soft portion SP2 may be in contact with the first soft portion SP1 which is disposed on the first recessed portion RE1.

Figure 4:
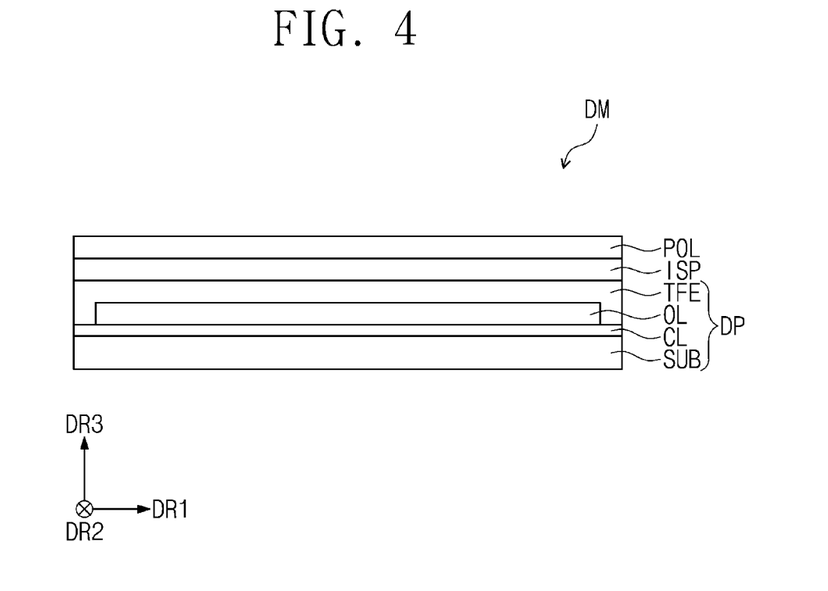
FIG. 4 is a schematic cross-sectional view of a display module according to an embodiment.

FIG. 4 is a schematic cross-sectional view of a display module according to an embodiment. Hereinafter, a stack structure of a display module DM according to an embodiment will be described with reference to FIG. 4. The above description may be similarly applied to the description of each component, and redundant descriptions will be omitted.

Referring to FIG. 4, the display module DM may include a display panel DP, an input sensing portion ISP, and an anti-reflective layer POL.

The display module DM may display images, and may sense an input of a user. The display module DM may be a flexible display module. For example, the display module DM may be folded with respect to a folding axis FX (see FIG. 2).

The display panel DP may include a base substrate SUB, a circuit layer CL, a display element layer OL, and a thin film sealing layer TFE. In an embodiment, the base substrate SUB, the circuit layer CL, the display element layer OL, and the thin film sealing layer TFE may be sequentially stacked each other along the third direction DR3.

The base substrate SUB may include a flexible material, and the base substrate SUB may be, for example, a plastic substrate. The plastic substrate may include at least one of an acrylic resin, a methacrylic resin, a polyisoprene-based resin, a vinyl-based resin, an epoxy-based resin, a urethane-based resin, a cellulose-based resin, a siloxane-based resin, a polyimide-based resin, a polyamide-based resin, or a perylene-based resin. For example, the base substrate SUB may include a single layered polyimide-based resin. However, an embodiment is not limited thereto, and the base substrate SUB may be a stack structure including insulating layers.

The circuit layer CL may include an insulating layer, a semiconductor pattern, a conductive pattern, a signal line, etc., within the spirit and the scope of the disclosure.

An insulating layer, a semiconductor layer, and a conductive layer may be formed on the base substrate SUB through coating and deposition, and may be selectively patterned through plural photolithography processes. A semiconductor pattern, a conductive pattern, and a signal line of the circuit layer CL may be formed.

The display element layer OL may be disposed on the circuit layer CL. The display element layer OL may include a light-emitting element. For example, the display element layer OL may include an organic light-emitting material, a quantum dot, a quantum rod, or a micro LED.

The thin film sealing layer TFE may be disposed on the circuit layer CL so as to cover or overlap the display element layer OL. The thin film sealing layer TFE may include an inorganic layer, an organic layer, and an inorganic layer which may be sequentially stacked each other. The inorganic layer may include an inorganic material, and may protect pixels from moisture or oxygen. The organic layer may include an organic material, and may protect pixels from foreign matters such as dust particles.

In the above description, the description has been made assuming that the display panel DP is an organic light-emitting display panel, but an embodiment is not limited thereto. For example, the display panel DP may be a liquid crystal display panel.

The input sensing portion ISP may include sensors for sensing an external input. The sensors may capacitively sense an external input. The external input may include various types of inputs such as a portion of a user's body, light, heat, a pen, or pressure.

The input sensing portion ISP may be disposed on or may be directly disposed on the thin film sealing layer TFE. For example, the input sensing portion ISP may be formed on the thin film sealing layer TFE through a continuous process. However, an embodiment is not limited thereto, and the input sensing portion ISP may be bonded to the display panel DP via a bonding agent after being formed through a separate process.

The anti-reflective layer POL may be disposed on the input sensing portion ISP. The anti-reflective layer POL may be a film for protecting the reflection of external light. The anti-reflective layer POL may reduce the reflectance of external light incident from the display device DD onto the display panel DP. For example, the anti-reflective layer POL may include a phase retarder and/or a polarizer.

The display module DM may include adhesive members. For example, respective layers of the display module DM may be connected to each other by adhesive members disposed between adjacent layers.

Figure 5:
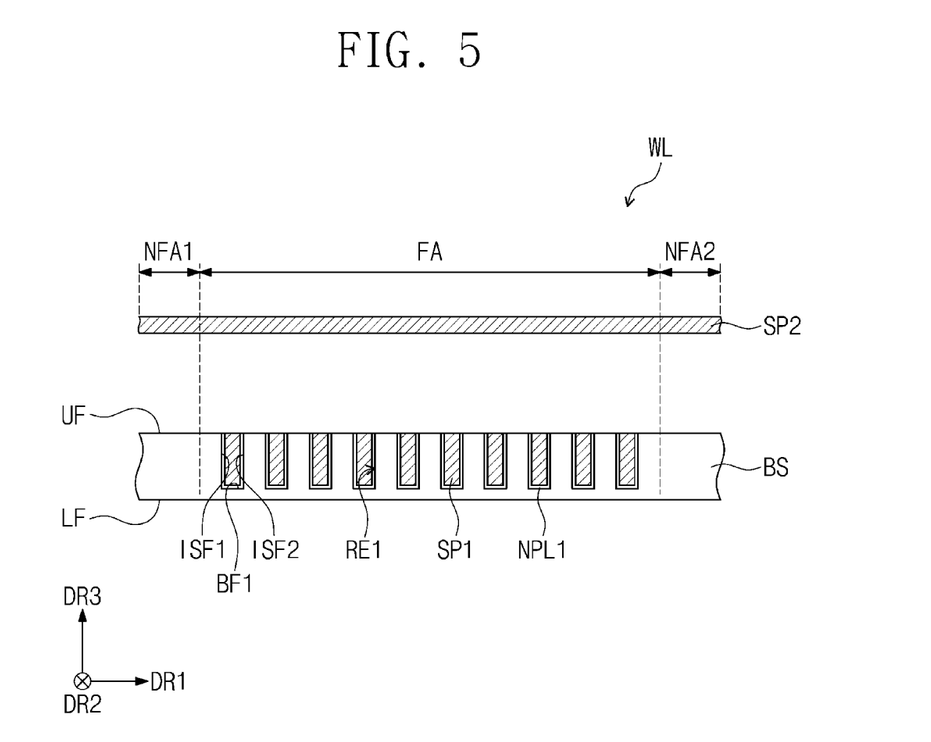
FIG. 5 is a schematic cross-sectional view of a portion of a window according to an embodiment.
Figure 6:
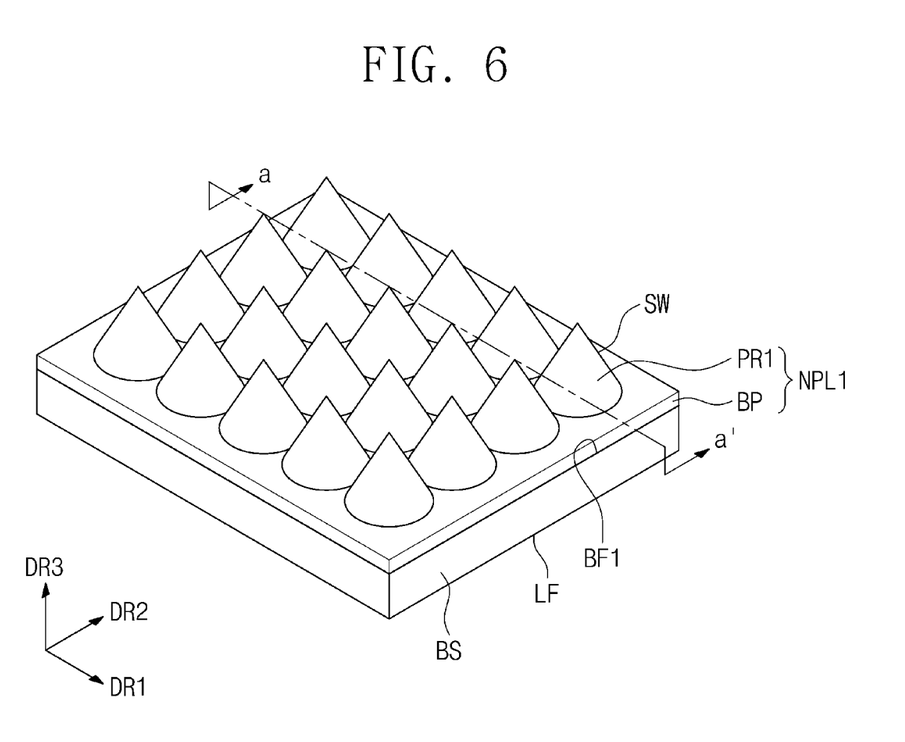
FIG. 6 is a schematic perspective view illustrating a portion of a nano pattern layer according to an embodiment.
Figure 7A:
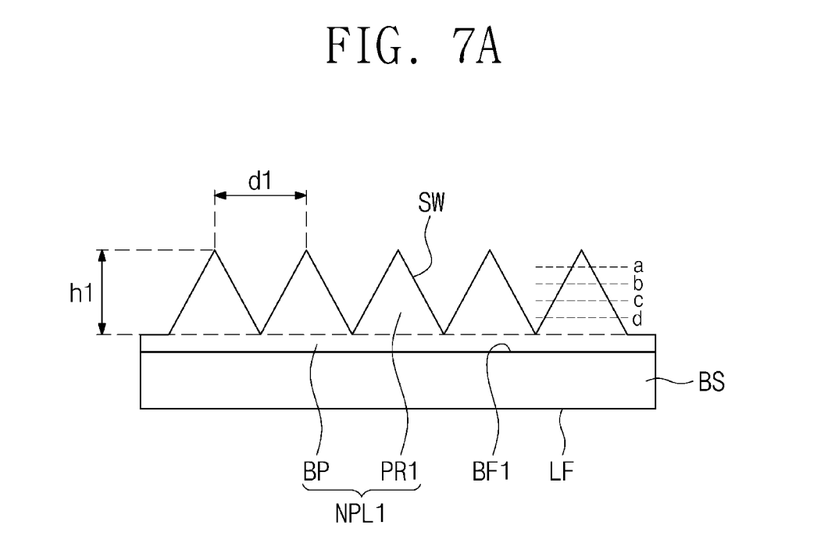
FIGS. 7A and 7B are schematic cross-sectional views illustrating a portion of a nano pattern layer according to an embodiment.
Figure 7B:
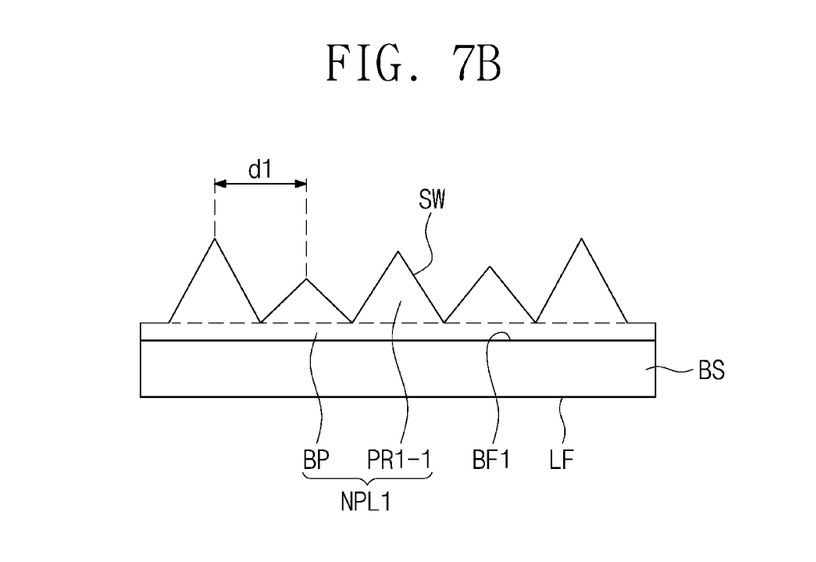

FIG. 5 is a schematic cross-sectional view illustrating a portion of a window according to an embodiment. For convenience of description, FIG. 5 illustrates that the base layer BS and the second soft portion SP2 are separated. FIG. 6 is a schematic perspective view illustrating a portion of a nano pattern layer according to an embodiment. FIGS. 7A and 7B are schematic cross-sectional views illustrating a portion of a nano pattern layer according to an embodiment. FIGS. 7A and 7B illustrates a part taken along line a-a' of FIG. 6.

Referring to FIGS. 3 and 5, the window WL is disposed on the display module DM, and protects the display module DM from an external scratch, and performs a folding operation and an unfolding operation integrally with the display module DM. Accordingly, it is necessary for the window WL used in a flexible display device to have a high impact resistance for protecting the display module DM, and a high flexibility for facilitating a folding operation.

The window WL according to the disclosure has a pattern on a folded portion of the base layer BS, thereby having both excellent impact resistance and high flexibility. Hereinafter, the window WL according to an embodiment will be described in more detail.

The window WL may include a base layer BS, a first soft portion SP1, and a second soft portion SP2. The base layer BS may be disposed on the display module DM. The base layer BS may be composed of a material which is optically transparent, and physically strong and hard. For example, the base layer BS may include a material such as transparent glass, colorless polyimide (CPI), polyethylene terephthalate (PET), and cyclo-olefin polymer (COP). However, a material of the base layer BS is not limited thereto.

The base layer BS may include a first non-folding region NFA1, a folding region FA, and a second non-folding region NFA2 which are sequentially arranged or disposed along the first direction DR1.

The base layer BS may include an upper surface OF and a lower surface LF. The upper surface UF and the lower surface LF may be defined by a plane defined by the first direction DR1 and the second direction DR2. In an embodiment, the upper surface UF and the lower surface LF of the base layer BS may each have a flat surface.

A first recessed portion RE1 may be defined in the base layer BS. For example, the first recessed portion RE1 may overlap the folding region FA, and may be recessed from the upper surface UF of the base layer BS in the third direction DR3. The first recessed portion RE1 may not be defined in the first and second non-folding regions NFA1 and NFA2. In the disclosure, the first recessed portion RE1 may be referred to as a pattern, and a region in which the first recessed portion RE1 is defined and a region which overlaps the first recessed portion RE1 may be referred to as pattern regions. For example, the folding region FA of the base layer BS may be referred to as a pattern region.

The first recessed portion RE1 may be defined by a first inner surface ISF1, a second inner surface ISF2, and a first bottom surface BF1 which are defined in the base layer BS. The first inner surface ISF1 and the second inner surface ISF2 may each extend in the third direction DR3 and may be parallel to a plane defined by the second direction DR2 and the third direction DR3. The first inner surface ISF1 and the second inner surface ISF2 may be disposed facing each other.

The first bottom surface BF1 may be disposed between one end or an end of the first inner surface ISF1 and one end or an end of the second inner surface ISF2. The first bottom surface BF1 may be parallel to the upper surface UF of the base layer BS. In an embodiment, the first bottom surface BF1 may be perpendicular to the first inner surface ISF1 and the second inner surface ISF2.

In an embodiment, the first recessed portion RE1 may be provided in plurality. The first recessed portions RE1 may each extend in the second direction DR2. For example, the first recessed portions RE1 may be each parallel to the folding axis FX illustrated in FIG. 2. The first recessed portions RE1 may be provided spaced apart from each other along the first direction DR1. The depth of each of the first recessed portions RE1 may be smaller than the depth of the base layer BS, with respect to the third direction DR3.

FIG. 5 illustrates that ten first recessed portions RE1 are defined in the upper surface UF of the base layer BS, but this an example. Thus, an embodiment is not limited thereto. The number of the first recessed portions RE1 defined in the upper surface UF of the base layer BS may be changed according to the curvature of the display device DD (see FIG. 1) in case that folded, the width of the folding region FA, etc., within the spirit and the scope of the disclosure.

Referring to FIGS. 5 and 6, a first nano pattern layer NPL1 including first protrusion patterns PR1 may be disposed on the first recessed portion RE1. For example, the first nano pattern layer NPL1 may be disposed on the first bottom surface BF1 of the first recessed portion RE1, or disposed on the first inner surface ISF1 and the second inner surface ISF of the first recessed portion RE1. However, an embodiment is not limited thereto, and, as illustrated in FIG. 5, the first nano pattern layer NPL1 may be disposed on all of the first bottom surface BF1, the first inner surface ISF1, and the second inner surface ISF2. Detailed description on the first nano pattern layer NPL1 will be described later.

In an embodiment, the first soft portion SP1 may be disposed in the first recessed portion RE1. For example, the first soft portion SP1 may be disposed on the first nano pattern layer NPL1 disposed on the first recessed portion RE1. The first soft portion SP1 may be disposed on the first nano pattern layer NPL1, and may be disposed filling the first recessed portion RE1 such that the upper surface of the first soft portion SP1 is parallel to the upper surface UF of the base layer BS.

The first soft portion SP1 may include a material which is optically transparent and flexible. For example, the first soft portion SP1 may include a material of which the harness and strength are physically lower than those of the base layer BS. For example, the first soft portion SP1 may include a transparent polymer resin, but is not limited thereto. Since the first soft portion SP1 may include a flexible material, folding characteristics in the folding region FA may be further improved in case that the first soft portion SP1 is disposed in the first recessed portion RE1.

The second soft portion SP2 may be disposed on the upper surface OF of the base layer BS. For example, the second soft portion SP2 may be disposed to entirely cover or overlap the upper surface UF of the base layer BS. Accordingly, at least a portion of the second soft portion SP2 may be in contact with the first soft portion SP1. The upper surface and the lower surface of the second soft portion SP2 may be each parallel to a plane defined by the first direction DR1 and the second direction DR2. In an embodiment, the thickness of the second soft portion SP2 may be smaller than the thickness of the base layer BS with respect to the third direction DR3. For example, the thickness of the second soft portion SP2 may be in a range of about 0.2 μm to about 10.0 μm, but is not limited thereto.

In an embodiment, the second soft portion SP2 may protect the window WL. For example, the second soft portion SP2 may protect the base layer BS included in the window WL from an external impact. The second soft portion SP2 may improve the durability of the window WL.

In case that the first soft portion SP1 is disposed in the first recessed portion RE1, a height difference between the first soft portion SP1 and the upper surface UF of the base layer BS may occur, thereby causing fine irregularities. In the disclosure, as the second soft portion SP2 is disposed on the upper surface UF of the base layer BS, the second soft portion SP2 may be bonded to the first soft portion SP1 and the upper surface UF of the base layer BS, and the irregularities may be flattened, so that the durability of the window WL may be further improved.

The second soft portion SP2 may include a material which is optically transparent and flexible. For example, the second soft portion SP2 may include a material of which the harness and strength are physically lower than those of the base layer BS. For example, the second soft portion SP2 may include a transparent polymer resin, but is not limited thereto.

In an embodiment, the first soft portion SP1 and the second soft portion SP2 may include the same material or similar material. The first soft portion SP1 and the second soft portion SP2 may be formed through the same process, and may thus have an integrated shape on the base layer BS. In the forming of the window WL, the first recessed portion RE1 of the base layer BS and the entire upper surface UF of the base layer BS may be coated with a resin, and the first soft portion SP1 and the second soft portion SP2 may be formed by hardening the resin with heat or light. However, the forming method of the first and second soft portions SP1 and SP2 is not limited thereto.

A display device according to an embodiment may include a base layer in which a recessed portion is defined, and a window which may include a soft portion disposed in the recessed portion. The recessed portion may be disposed overlapping a folding region, and thus form a pattern on the window. Accordingly, a display device according to an embodiment may ensure both high flexibility in a folding region, and impact resistance in a non-folding region, so that the reliability of a display device may be further improved.

In a window in which a pattern is formed in a folding region, Fresnel reflection by external light may occur at the interface between a pattern region and the window due to the difference in refractive index, and a phenomenon that the pattern region is visually recognized to the outside due to such reflection may occur.

To prevent such a light reflection phenomenon, a method of similarly matching the refractive index of a material of the pattern region with that of the window, or inducing destructive interference by applying a multilayered thin film having different refractive indices have been used. However, such a method may be focused on refractive index matching, and thus may have a limitation in that restriction requirements for physical properties such as stability, thermomechanical properties, and adhesion of a stacked thin film may occur. In the case of applying a multilayered thin film, it may be advantageous in that an anti-reflection effect may be achieved over a wide range, but there may be a limitation in selection of materials which may be used as stacked materials due to the limitation of the number of materials having specific or given refractive indices.

A display device according to an embodiment is provided with a window in which a pattern is formed in a folding region, and may include a nano pattern layer having a protrusion pattern of a three-dimensional shaped nano structure on the pattern. Accordingly, the amount of light reflected at the interface between the window and the pattern may be effectively reduced, and therefore, the optical characteristics of the display device may be improved. Various materials which satisfy physical properties such as glass transition temperature, modulus, and elongation may be applied to the pattern region, and ultra-low reflection effects may also be achieved even in changes in refractive index caused by thermomechanical deformation or temperature change, for example, thereby providing a display device with ensured reliability.

Referring to FIGS. 5 and 6, a first nano pattern layer NPL1 according to an embodiment may be disposed in the first recessed portion RE1 of the base layer BS. FIG. 6 illustrates that the first nano pattern layer NPL1 is disposed on the first bottom surface BF1, but an embodiment is not limited thereto. For example, the first nano pattern layer NPL1 may be disposed on the first inner surface ISF1 and the second inner surface ISF2 of the first nano pattern layer NPL1.

The first nano pattern layer NPL1 may include a base portion BP and first protrusion patterns PR1. The base portion BP may be a member that provides a base surface on which the first protrusion patterns PR1 are disposed. In an embodiment, the first protrusion patterns PR1 and the base portion BP may have an integrated shape. However, an embodiment is not limited thereto.

The base portion BP may be disposed on or may be directly disposed on the first bottom surface BF1 of the first recessed portion RE1, but an embodiment is not limited thereto. Thus, the base portion BP of the first nano pattern layer NPL1 may be omitted depending on a processing method or a processing condition, and the first protrusion patterns PR1 may be disposed on or may be directly disposed on the first bottom surface BF1 of the first recessed portion RE1.

Referring to FIGS. 6 and 7A, the first protrusion patterns PR1 may mean a nano sized-structure. For example, the first protrusion patterns PR1 may be moth-eye patterns. The moth-eye patterns are patterns in which nano-sized structures are arranged or disposed in a period or interval, and may mean biomimetic patterns which mimic the compound eye structure of a moth.

In an embodiment, the protrusion patterns PR1 may be uniformly disposed on the base portion BP and each have a height h1 and a line width d1. In an embodiment, the height h1 of each of the first protrusion patterns PR1 may be in a range of about 200 nm to about 3000 nm, and the line width d1 of each of the first protrusion patterns PR1 may be in a range of about 100 nm to about 350 nm. In case that the height h1 and line width d1 of each of the protrusion patterns PR1 satisfy the aforementioned ranges, an anti-reflection effect may be exhibited in the entire visible light band, and the diffraction of light by the pattern may be minimized, thereby reducing the reflectance. In the disclosure, the line width d1 may mean a spacing between the centers of adjacent first protrusion patterns PR1.

In an embodiment, the ratio of the line width d1 to the height h1 of each of the first protrusion patterns PR1 may be in a range of about 0.03 to about 1.75, for example, in a range of about 0.04 to about 1.5. In case that the ratio of the line width d1 to the height h1 of each of the first protrusion patterns PR1 satisfies the aforementioned range, the wavelength dependency of reflection characteristics may be reduced, which may be more advantageous in terms of anti-reflection. The smaller ratio of the line width d1 to the height h1 of each of the first protrusion patterns PR1 may be desirable within the aforementioned ranges of the height h1 and the line width d1.

In an embodiment, the first protrusion patterns PR1 may be arranged or disposed in various forms within the aforementioned range of the line width d1. FIG. 6 illustrates that the respective first protrusion patterns PR1 are uniformly arranged or disposed in a matrix form on the base portion BP, but an embodiment is not limited thereto.

Referring to FIG. 7B, the heights of first protrusion patterns PR1-1 may be different from each other. For example, the line width d1 of each of the first protrusion patterns PR1-1 may be constant, and the heights of the first protrusion patterns PR1-1 may be different from each other in the aforementioned range.

The first protrusion patterns PR1 may each include a conical shape. For example, the first protrusion patterns PR1 may each have a conical shape defined by a sidewall SW having a positive slope. FIG. 7A illustrates that the bottom surfaces of the first protrusion patterns PR1 are in contact with each other, but an embodiment is not limited thereto. The bottom surfaces of the first protrusion patterns PR1 may not be in contact with each other, and the first protrusion patterns PR1 may be disposed spaced apart from each other with a spacing.

The shape of each of the first protrusion patterns PR1 may be changed into various shapes to effectively prevent reflection. In an embodiment, the first protrusion patterns PR1 may include any one among a conical shape, a rotating parabolic shape, and a hemispherical shape. However, the shape of each of the first protrusion patterns PR1 is not limited thereto. For example, the first protrusion pattern PR1 may have various shapes, as long as the refractive index may continuously change in the height direction. For example, the first protrusion pattern PR1 may be shaped such that the cross-sectional area thereof increases from the top to the bottom. Assuming that the first soft portion SP1 (see FIG. 5) is disposed on the first protrusion pattern PR1 in FIG. 7A, the cross-sectional area ratio of the first protrusion pattern PR1 to the first soft portion SP1 at points a, b, c, and d in FIG. 7A may gradually increase. Accordingly, the refractive index according to the height of the first protrusion pattern PR1 changes linearly, and thus the reflection of incident light due to difference in refractive index may be prevented. Here, the refractive index ($n_{RI}$) of the first protrusion pattern PR1 is represented by Equation 1.

$$n_{RI} = n_{RS} \times A + n_{PR} \times B \quad \text{[Equation 1]}$$

In Equation 1, $n_{RS}$ is the refractive index of the first soft portion SP1, $n_{PR}$ is the refractive index of the first protrusion pattern PR1, A is the cross-sectional area ratio of the first soft portion SP1, and B is the cross-sectional area ratio of the first protrusion pattern PR1. Here, $n_{PR}$ may be greater than $n_{RS}$. The first protrusion pattern PR1 is used as an example in description of Equation 1, but an embodiment is not limited thereto. Equation 1 may be similarly applied to a second protrusion pattern and a third protrusion pattern.

The first nano pattern layer NPL1 may be composed of various materials. For example, the first nano pattern layer NPL1 may include at least one material selected from the group consisting of a curable resin, a metal, a metal oxide, a carbide such as silicon carbide, a hollow inorganic oxide such as hollow silica, a silicon wafer material, etc., within the spirit and the scope of the disclosure.

However, an embodiment is not limited thereto.

The curable resin is not specially limited as long as the resin may form a pattern through an ultraviolet curing reaction, but may use, for example, at least one selected from the group consisting of an acrylic-based resin, an epoxy-based resin, and an urethan-based resin. However, an embodiment is not limited thereto, and a photocurable resin, which is curable by visible light, for example, or a thermosetting resin may also be used.

Examples of the metal may include a metal such as Au, Zn, Sn, Ti, Si, Al, Ag, Zr, Ni, Mn, Cu, Cr, Fe, Co, Pt, Pd, Wu, and Ba, and a metal alloy in which at least one metal element or at least one non-metal element is added to the metal.

Examples of the metal oxide may include nano particles of a metal oxide composed of a metal such as Au, Zn, Sn, Ti, Si, Al, Ag, Zr, Ni, Mn, Cu, Cr, Fe, Co, Pt, Pd, Wu, and Ba alone, or combination of at least two thereof, and may include, by way of example, $SiO_2$, $Al_2O_3$, $CeO_x$, $ZnO$, $TiO_2$, $SnO_2$, etc., within the spirit and the scope of the disclosure.

In case that the first nano pattern layer NPL1 may include the nano particles of the metal oxide, the nano particles may be coated with a resin. For example, at least one material of siloxane, polysilazane, and polymethylmethacrylate (PMMA) may be used as the resin, and, by way of example, polysilazane may be used.

In an embodiment, the first nano pattern layer NPL1 may be formed by using various methods such as dry etching such as plasma etching, ion beam etching, and laser etching, wet etching using an etching solution, dip coating, calcination, hot embossing, nano-imprint lithography, anodizing, nano-sphere lithography, laser holographic lithography, etc., within the spirit and the scope of the disclosure.

However, an embodiment is not limited thereto.

FIGS. 8 to 11 are schematic cross-sectional views illustrating a part of a window according to an embodiment. Hereinafter, for description of windows WL-1, WL-2, WL-3, and WL-4 according to an embodiment with reference to FIGS. 8 to 11, the same reference numerals are assigned to the same components as those described above, and detailed descriptions thereof will be omitted herein.

Figure 8:
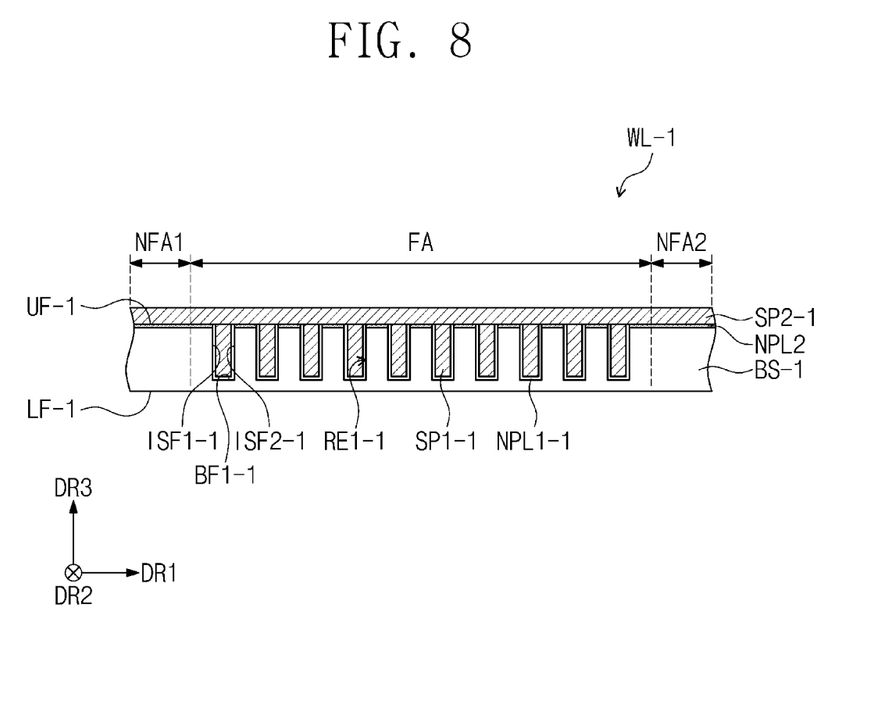
FIGS. 8 to 10 are schematic cross-sectional views illustrating a portion of a window according to an embodiment.

Referring to FIG. 8, a window WL-1 according to an embodiment may further include a second nano pattern layer NPL2.

The second nano pattern layer NPL2 may be disposed on a portion overlapping the first non-folding region NFA1 and the second non-folding region NFA2 on the upper surface UF-1 of a base layer BS-1. The base layer BS-1 may also include a lower surface LF-1. A portion of the second nano pattern layer NPL2 may be disposed on a portion overlapping the folding region FA on the upper surface UF-1 of the base layer BS-1. For example, the second nano pattern layer NPL2 may be disposed on a portion on which a first recessed portion RE1-1 is not defined on the upper surface UF-1 of the base layer BS-1.

The first nano pattern layer NPL1-1 may be disposed on the first recessed portion RE1-1. For example, the first nano pattern layer NPL1-1 may be disposed on all of the first inner surface ISF1-1, the second inner surface ISF2-1, and the first bottom surface BF1-1 of the first recessed portion RE1-1. However, an embodiment is not limited thereto. For example, the first nano pattern layer NPL1-1 may be disposed on the first bottom surface BF1-1 of the first recessed portion RE1-1, and may not be disposed on the first inner surface ISF1-1 and the second inner surface ISF2-1.

Since the first nano pattern layer NPL1-1 is disposed on the first recessed portion RE1-1, and the second nano pattern layer NPL2 is disposed on a portion on which the first recessed portion RE1-1 is not defined, the anti-reflective effect of external light may be exhibited on the entire base layer BS-1. For example, the anti-reflective effect of external light may be exhibited on all the first non-folding region NFA1, the folding region FA, and the second non-folding region NFA2, and thus, the optical characteristics and the visibility of a display device may be further improved.

In an embodiment, the first nano pattern layer NPL1-1 and the second nano pattern layer NPL2 may be formed through the same process. Accordingly, the first nano pattern layer NPL1-1 and the second nano pattern layer NPL2 may include the same material or similar material. However, an embodiment is not limited thereto.

The second nano pattern layer NPL2 may be the same as the first nano pattern layer NPL1 illustrated in FIG. 6. For example, the second nano pattern layer NPL2 may include a base portion BP, and second protrusion patterns disposed on the base portion BP, and the second protrusion patterns may be the same as the first protrusion patterns PR1 illustrated in FIG. 6. However, an embodiment is not limited thereto.

A first soft portion SP1-1 may be disposed on the first recessed portion RE1-1. For example, the first soft portion SP1-1 may be disposed on the first nano pattern layer NPL1-1 disposed in the first recessed portion RE1-1.

A second soft portion SP2-1 may be disposed on the second nano pattern layer NPL2. The second soft portion SP2-1 may entirely cover or overlap the second nano pattern layer NPL2, and may not be in contact with the upper surface UF-1 of the base layer BS-1. In an embodiment, at least a portion of the second soft portion SP2-1 may be in contact with the first soft portion SP1-1. As the window WL-1 of an embodiment may further include the second nano pattern layer NPL2, there may be damage to the nano-sized second protrusion pattern due to scratch resistance. Such damage may cause the anti-reflection effect of the second nano pattern layer NPL2 to be lowered, thereby deteriorating visibility of a display device. In the window WL-1 of the disclosure, as the second soft portion SP2-1 is disposed on the second nano pattern layer NPL2, the second nano pattern layer NPL2 may be protected from external impact, thereby making it possible to prevent the visibility of a display device from deteriorating.

Figure 9:
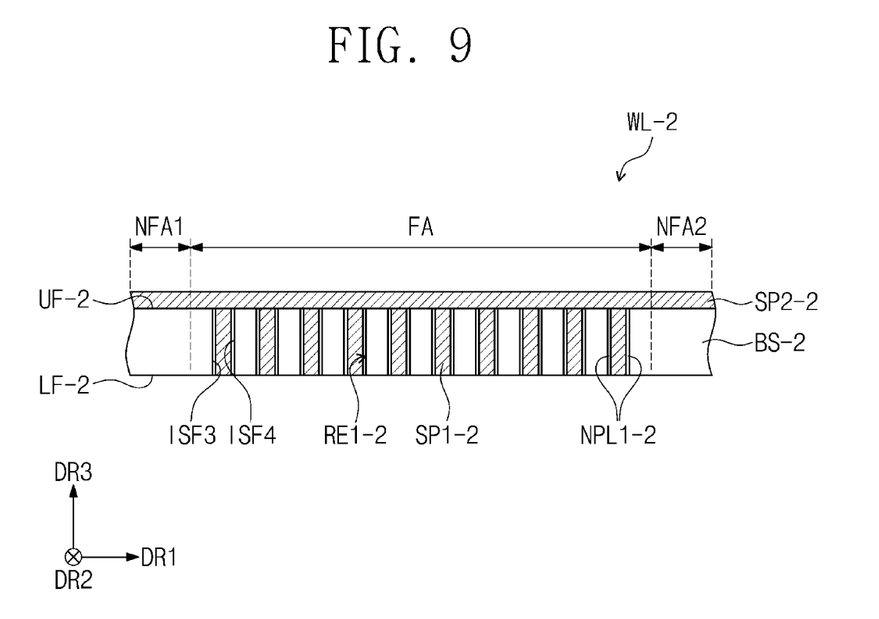

Referring to FIG. 9, the first recessed portion RE1-2 of a window WL-2 according to an embodiment may be different in shape, compared to the window WL illustrated in FIG. 5.

In the window WL-2 according to an embodiment, the first recessed portion RE1-2 may have a shape of a hole penetrating the base layer BS-2 in the third direction DR3. Accordingly, the depth of the first recessed portion RE1-2 may be the same as the thickness of the base layer BS-2.

In an embodiment, the first recessed portion RE1-2 may be defined by a third inner surface ISF3 and a fourth inner surface ISF4 of the base layer BS-2. The third inner surface ISF3 and the fourth inner surface ISF4 may each penetrate the base layer BS-2 in the third direction DR3, and may be parallel to a plane defined by the second direction DR2 and the third direction DR3. The third inner surface ISF3 and the fourth inner surface ISF4 may be disposed facing each other.

As illustrated in FIG. 9, the first recessed portion RE1-2 may be provided in plurality. First recessed portions RE1-2 may each extend in the second direction DR2. For example, the first recessed portions RE1-2 may extend in parallel to the folding axis FX illustrated in FIG. 2. The first recessed portions RE1-2 may be arranged or disposed spaced apart from each other in the first direction DR1.

Referring to FIGS. 9 and 6, the first nano pattern layer NPL1-2 may be disposed on the first recessed portion RE1-2. Since the first recessed portion RE1-2 penetrates the base layer BS-2, the first nano pattern layer NPL1-2 may be in contact with at least a portion of the third inner surface ISF3 or the fourth inner surface ISF4. However, an embodiment is not limited thereto, and the first nano pattern layer NPL1-2 may be entirely disposed on the third inner surface ISF3 and the fourth inner surface ISF4.

The first soft portion SP1-2 may be disposed on the first recessed portion RE1-2. For example, the first soft portion SP1-2 may be disposed on the first nano pattern layer NPL1-2, and entirely fill the first recessed portion RE1-2. Accordingly, the upper surface and the lower surface of the first soft portion SP1-2 may be disposed in parallel to the upper surface and the lower surface of the base layer BS-2, respectively.

A second soft portion SP2-2 may be disposed on the upper surface UF-2 of the base layer BS-2. For example, the second soft portion SP2-2 may be disposed on the entire upper surface UF-2 of the base layer BS-2, so that at least a portion of the second soft portion SP2-2 may be in contact with the first soft portion SP1-2. The base layer BS-2 may also include a lower surface LF-2.

Figure 10:
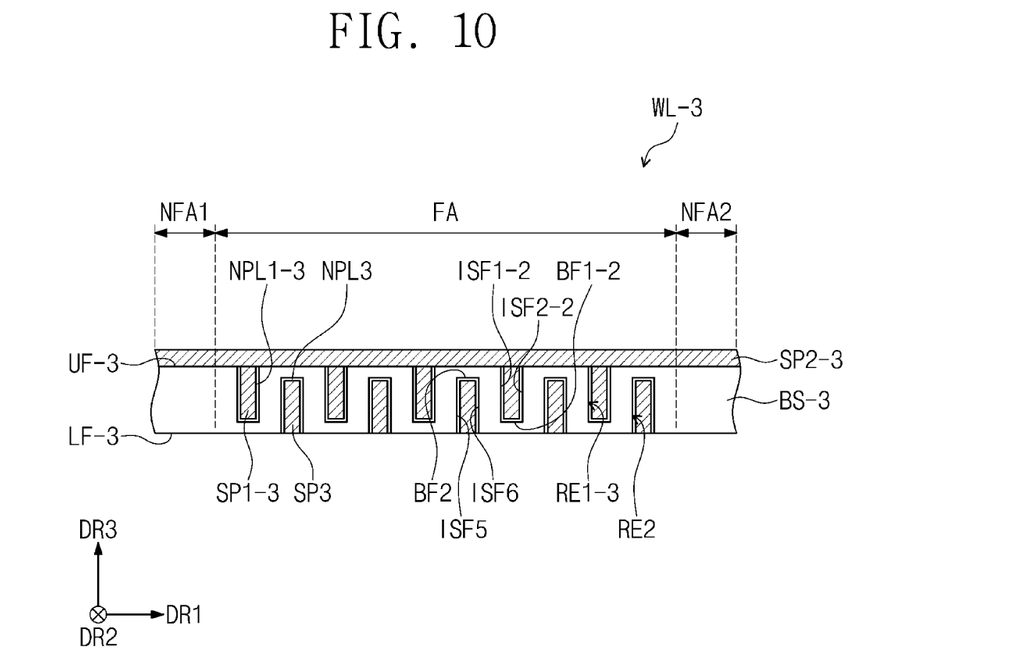

Referring to FIG. 10, a window WL-3 according to an embodiment may further include a second recessed portion RE2, compared to the window WL illustrated in FIG. 5.

A first recessed portion RE1-3 and the second recessed portion RE2, which overlap the folding region FA, may be defined in the base layer BS-3. The first recessed portion RE1-3 and the second recessed portion RE2 may not be defined in each of the first non-folding region NFA1 and the second non-folding region NFA2 of the base layer BS-3. The first recessed portion RE1-3 may be recessed from the upper surface UF-3 of the base layer BS-3 in a lower direction (for example, the opposite direction of the third direction DR3). The second recessed portion RE2 may be recessed from the lower surface LF-3 of the base layer BS-3 in an upper direction (for example, the third direction DR3). The depth of each of the first recessed portion RE1-3 and the second recessed portion RE2 may be smaller or less than the thickness of the base layer BS-3 with respect to the third direction DR3.

The first recessed portion RE1-3 and the second recessed portion RE2 may each extend in the second direction DR2. For example, the first recessed portion RE1-3 and the second recessed portion RE2 may extend in a direction parallel to the folding axis FX illustrated in FIG. 2

The second recessed portion RE2 may be defined by a fifth inner surface ISF5, a sixth inner surface ISF6, and a second bottom surface BF2 which are defined in the base layer BS-3. The fifth inner surface ISF5 and the sixth inner surface ISF6 may extend in the third direction DR3, and may be parallel to a plane defined by the second direction DR2 and the third direction DR3. The fifth inner surface ISF5 and the sixth inner surface ISF6 may be disposed facing each other.

The second bottom surface BF2 may be disposed between one end or an end of the fifth inner surface ISF5 and one end or an end of the sixth inner surface ISF6. The second bottom surface BF2 may be parallel to the upper surface UF-3 of the base layer BS-3. In an embodiment, the second bottom surface BF2 may be perpendicular to the fifth inner surface ISF5 and the sixth inner surface ISF6.

The first recessed portion RE1-3 and the second recessed portion RE2 may be each provided in plurality. First recessed portions RE1-3 and second recessed portions RE2 may be alternately arranged or disposed along the first direction DR1. In the first direction DR1, the second recessed portion RE2 may be disposed between adjacent first recessed portion RE1-3. The respective first recessed portions RE1-3 and the respective second recessed portions RE2 may be disposed spaced apart from each other along the first direction DR1.

Referring to FIGS. 10 and 6, the first nano pattern layer NPL1-3 may be disposed on the first recessed portion RE1-3. For example, the first nano pattern layer NPL1-3 may be disposed on a first bottom surface BF1-2, or may be disposed on a first inner surface ISF1-2 and a second inner surface ISF2-2. A first soft portion SP1-3 may be disposed on the first recessed portion RE1-3. For example, the first soft portion SP1-3 may be disposed on the first nano pattern layer NPL1-3, and entirely fill the first recessed portion RE1-3. Accordingly, the first soft portion SP1-3 may be parallel to the upper surface UF-3 of the base layer BS-3. A second soft portion SP2-3 may be disposed on the upper surface UF-3 of the base layer BS-3.

A third nano pattern layer NPL3 including third protrusion patterns may be disposed on the second recessed portion RE2. For example, the third nano pattern layer NPL3 may be disposed on the second bottom surface BF2 of the second recessed portion RE2. The third nano pattern layer NPL3 may also be disposed on the fifth inner surface ISF5 and the sixth inner surface ISF6 of the second recessed portion RE2. The third nano pattern layer NPL3 may be the same as the first nano pattern layer NPL1 illustrated in FIG. 6. For example, the third nano pattern layer NPL3 may include a base portion BP, and third protrusion pattern disposed on the base portion BP, and the third protrusion patterns may be the same as the first protrusion patterns PR1 illustrated in FIG. 6. However, an embodiment is not limited thereto. For example, the first protrusion pattern PR1 and the third protrusion pattern may differ from each other in shape, height, and line width, etc., within the spirit and the scope of the disclosure.

The third soft portion SP3 may be disposed on the second recessed portion RE2. For example, the third soft portion SP3 may be disposed on the third nano pattern layer NPL3, and entirely fill the second recessed portion RE2. Accordingly, the third soft portion SP3 may be parallel to the lower surface LF-3 of the base layer BS-3.

The third soft portion SP3 may include a material which is optically transparent and flexible. For example, the third soft portion SP3 may include a material of which the hardness and strength are physically lower than those of the base layer BS-3. For example, the third soft portion SP3 may include a transparent polymer resin, but an embodiment is not limited thereto. As the third soft portion SP3 may include a material having flexible characteristics, the folding characteristics of a window WL-3 may be further improved in case that the third soft portion SP3 is disposed on the second recessed portion RE2. The first soft portion SP1-3 and the third soft portion SP3 may include the same material or similar material, but an embodiment is not limited thereto.

In a window WL-3 of an embodiment, the first recessed portion RE1-3 and the second recessed portion RE2 are respectively defined on the upper surface UF-3 and the lower surface LF-3 so as to overlap the folding region of the base layer BS-3, and the first soft portion SP1-3 and the third soft portion SP3, which have flexible characteristics, are respectively disposed on the first recessed portion RE1-3 and the second recessed portion RE2, thereby making it possible to further improve the folding characteristics of the window WL-3.

Reflection of light at the interface of the first soft portion SP1-3 and the base layer BS-3 may occur due to the difference in the refractive index between the first soft portion SP1-3 and the base layer BS-3. For example, reflection of light may occur at the first inner surface ISF1-2, the second inner surface ISF2-2, and the first bottom surface BF1-2 of the first recessed portion RE1-3. In the disclosure, since at least one of the first inner surface ISF1-2, the second inner surface ISF2-2, or the first bottom surface BF1-2 of the first recessed portion RE1-3 is provided with the first nano pattern layer NPL1-3, reflection of light which would occur at the interface may be suppressed. Therefore, a phenomenon that a pattern region, in which the first recessed portion RE1-3 is formed, is visually recognized to the outside may be prevented.

Reflection of light at the interface between the third soft portion SP3 and the base layer BS-3 may occur due to the difference in the refractive index between the third soft portion SP3 and the base layer BS-3. For example, reflection of light may occur on the fifth inner surface ISF5, the sixth inner surface ISF6, and the second bottom surface BF2 of the second recessed portion RE2. In the disclosure, since at least one of the fifth inner surface ISF5, the sixth inner surface ISF6, or the second bottom surface BF2 of the second recessed portion RE2 is provided with the third nano pattern layer NPL3, reflection of light which would occur at the interface may be suppressed. Thus, a phenomenon that a pattern region, in which the second recessed portion RE2 is formed, is visually recognized to the outside may be prevented.

Figure 11:
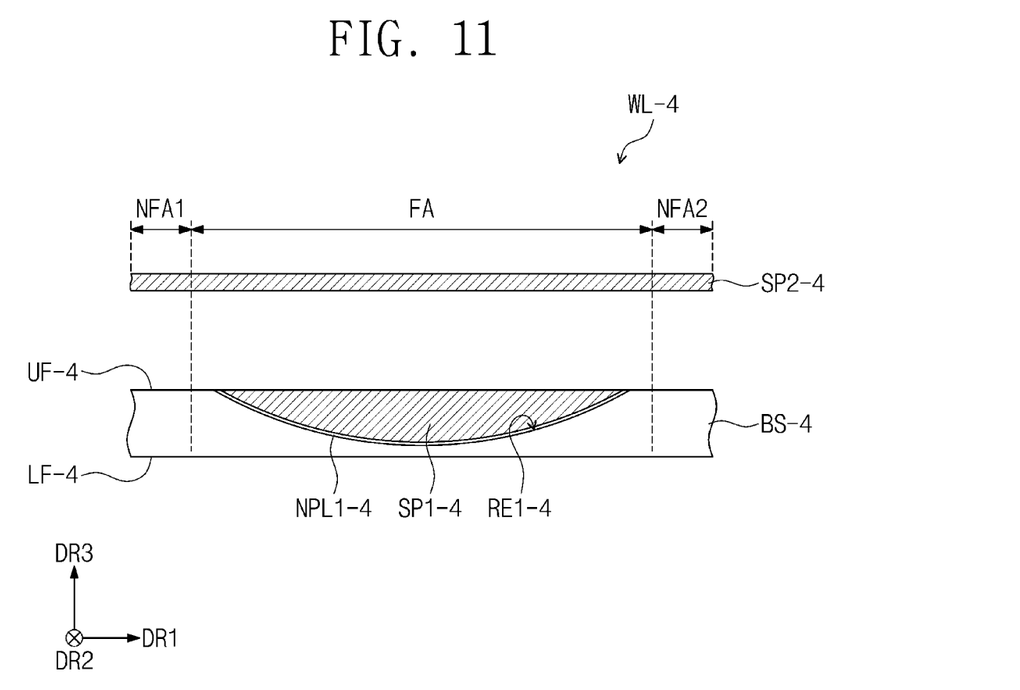
FIG. 11 is a schematic cross-sectional view of a portion of a window according to an embodiment

Referring to FIG. 11, a first recessed portion RE1-4 of a window WL-4 of an embodiment may be different, compared to the window illustrated in FIG. 5.

The depth of the first recessed portion RE1-4 defined in a base layer BS-4 may not be constant. For example, the first recessed portion RE1-4 may have a substantially curved surface shape extending in the first direction DR1. For example, the depth of the first recessed portion RE1-4 may be maximum at the center thereof, and may gradually decrease far away from each of the first non-folding region NFA1 and the second non-folding region NFA2. The base layer BS-4 may also include an upper surface UF-4 and a lower surface LF-4. A first soft portion SP1-4 may be disposed on the first recessed portion RE1-4. For example, the first soft portion SP1-4 may be disposed on the first nano pattern layer NPL1-4 disposed in the first recessed portion RE1-4. The window WL-4 may also include a second soft portion SP2-4.

Referring to FIGS. 11 and 6, since the first recessed portion RE1-4 has a curved surface shape, the first nano pattern layer NPL1-4 may be disposed on the curved surface of the first recessed portion RE1-4. The first nano pattern layer NPL1-4 may be disposed on the entire curved surface of the first recessed portion RE1-4. However, an embodiment is not limited thereto, and the first nano pattern layer NPL1-4 may be disposed on a portion of the curved surface of the first recessed portion RE1-4.

In a display device including a window in which a pattern is formed in a folding region, light incident from the outside to a pattern region may be reflected at the interface between the pattern region and the window due to the difference in refractive index, resulting in a phenomenon that the pattern region is visually recognized to the outside. In the disclosure, by adopting a nano pattern layer having nano-sized protrusion patterns at the interface between the pattern region and the window, a phenomenon that the pattern region is visually recognized to the outside may be prevented through an ultralow reflection effect. Accordingly, in case that a window having the nano pattern layer is applied to a display device, the optical characteristics of the display device may be improved.

Unlike methods of identically or similarly matching the refractive index value of a material filling a pattern region and the refractive index value of a window, the allowable refractive index range is widened, so that the selectivity of the types of material for the pattern region may be increased.

Therefore, it is possible to appropriately select a material satisfying physical properties such as the glass-transition temperature, the modulus, and the elongation. Since a low reflection effect may be exhibited even in case that the refractive index changes due to thermomechanical deformation or temperature change, the reliability of a display device may be further improved.

According to an embodiment, the folding characteristics and the optical characteristics of a display device may be improved by a recessed portion provided on a window and a nano pattern layer disposed on the recessed portion. The nano pattern layer including a protrusion pattern having a moth-eye structure may be provided, so that a pattern, in which the recessed portion may be defined, may not be visually recognized from the outside.

In the above, description has been made with reference to embodiments, however, those skilled in the art or those of ordinary skill in the relevant technical field may understand that various modifications and changes may be made to the disclosure without departing from the spirit and the scope of the disclosure. Therefore, the scope of the disclosure is not limited to the contents described in the detailed description of the specification, but is intended to include equivalents thereof and may be determined by the claims.

What is claimed is:

1. A window comprising:
   a base layer including:
      a first non-folding region;
      a second non-folding region;
      a folding region disposed between the first non-folding region and the second non-folding region in a first direction; and
      at least one first recessed portion overlapping the folding region and extending in a second direction intersecting the first direction;
   a first nano pattern layer disposed in the at least one first recessed portion, and including first protrusion patterns; and
   a first soft portion disposed on the first nano pattern layer.

2. The window of claim 1, further comprising:
   a second soft portion disposed on an upper surface of the base layer,
   wherein the first soft portion and the second soft portion include a same material.

3. The window of claim 1, further comprising:
   a second nano pattern layer disposed on a portion overlapping the first non-folding region and the second non-folding region of an upper surface of the base layer, and including second protrusion patterns.

4. The window of claim 1, wherein the first protrusion patterns include at least one of a substantially conical shape, a substantially rotating parabolic shape, and a substantially hemispherical shape.

5. The window of claim 1, wherein
   a line width of each of the first protrusion patterns is in a range of about 100 nm to about 350 nm, and
   a height of each of the first protrusion patterns is in a range of about 200 nm to about 3000 nm.

6. The window of claim 1, wherein
   the at least one first recessed portion comprises first recessed portions, and
   the first recessed portions are each spaced apart in the first direction.

7. The window of claim 1, wherein
   the at least one first recessed portion is recessed from an upper surface of the base layer, and
   a depth of the at least one first recessed portion recessed from the upper surface is less than a thickness of the base layer.

8. The window of claim 7, wherein the at least one first recessed portion includes:
   a first inner surface on the base layer, and extending in a third direction intersecting the first direction and the second direction;
   a second inner surface extending in the third direction, and facing the first inner surface; and
   a first bottom surface perpendicular to the first inner surface and the second inner surface.

9. The window of claim 8, wherein the first nano pattern layer is disposed on the first bottom surface.

10. The window of claim 8, wherein the first nano pattern layer is disposed on the first inner surface and the second inner surface.

11. The window of claim 1, wherein
    at least one second recessed portion recessed from a lower surface of the base layer and extending in the second direction is formed in the base layer, and
    the window comprises a third nano pattern layer disposed on the at least one second recessed portion, and including third protrusion patterns.

12. The window of claim 11, wherein
    the at least one first recessed portion includes first recessed portions,
    the at least one second recessed portion includes second recessed portions, and
    the first recessed portions and the second recessed portions are alternately disposed in the first direction.

13. The window of claim 11, further comprising:
    a third soft portion disposed in the second recessed portion.

14. The window of claim 1, wherein
    the at least one first recessed portion passes through the base layer, and
    the at least one first recessed portion is formed by:
       a third inner surface on the base layer and extending in a third direction intersecting the first direction and the second direction; and
       a fourth inner surface extending in the third direction and facing the third inner surface.

15. The window of claim 14, wherein the first nano pattern layer contacts at least a portion of the third inner surface or the fourth inner surface.

16. The window of claim 1, wherein the at least one first recessed portion has a substantially curved surface shape extending in the first direction.

17. A display device comprising:
    a display module including a folding region folded around a folding axis extending in a direction; and
    a window disposed on the display module, and folded with the display module, wherein
    the window includes:
       a base layer including a first recessed portion overlapping the folding region and extending in the direction;
       a first nano pattern layer disposed on the first recessed portion, and including first protrusion patterns; and
       a first soft portion disposed on the first nano pattern layer, and
       the first recessed portion is recessed from an upper surface of the base layer.

18. The display device of claim 17, further comprising:
    a second soft portion disposed on the upper surface of the base layer, wherein the first soft portion and the second soft portion include a same material.

19. The display device of claim 17, wherein the first protrusion patterns each include at least one of a substantially conical shape, a substantially rotating parabolic shape, and a substantially hemispherical shape.

20. The display device of claim 17, wherein
a line width of each of the first protrusion patterns is in a range of about 100 nm to about 350 nm, and
a height of each of the first protrusion patterns is in a range of about 200 nm to about 3000 nm.

* * * * *